United States Patent
Meegan et al.

(10) Patent No.: US 11,123,936 B2
(45) Date of Patent: Sep. 21, 2021

(54) RESIN INFUSION PROCESS FOR MANUFACTURING FIBER-REINFORCED COMPOSITES

(71) Applicant: CYTEC INDUSTRIES INC., Princeton, NJ (US)

(72) Inventors: Jonathan Edward Meegan, Chester (GB); Michael Alexander Smith, Sun Lakes, AZ (US); Scott Alfred Rogers, Placentia, CA (US); Jeffrey Jon Rose, Winona, MN (US)

(73) Assignee: CYTEC INDUSTRIES INC., Princeton, NJ (US)

( * ) Notice: Subject to any disclaimer, the term of this patent is extended or adjusted under 35 U.S.C. 154(b) by 517 days.

(21) Appl. No.: 15/781,935

(22) PCT Filed: Dec. 15, 2016

(86) PCT No.: PCT/US2016/067011
§ 371 (c)(1),
(2) Date: Jun. 6, 2018

(87) PCT Pub. No.: WO2017/106550
PCT Pub. Date: Jun. 22, 2017

(65) Prior Publication Data
US 2018/0272628 A1    Sep. 27, 2018

Related U.S. Application Data

(60) Provisional application No. 62/267,947, filed on Dec. 16, 2015.

(51) Int. Cl.
*B29C 70/48* (2006.01)
*B29C 48/475* (2019.01)
(Continued)

(52) U.S. Cl.
CPC ............ *B29C 70/48* (2013.01); *B29B 13/022* (2013.01); *B29C 48/288* (2019.02);
(Continued)

(58) Field of Classification Search
CPC ..... B29C 70/48; B29C 48/288; B29C 48/388; B29C 48/286; B29C 48/873; B29C 48/832; B29B 13/022
See application file for complete search history.

(56) References Cited

U.S. PATENT DOCUMENTS 2,731,145 A    1/1956  Kritscher
3,072,251 A    1/1963  Sauve
(Continued)

FOREIGN PATENT DOCUMENTS

EP    0193068 A1    9/1986
FR    2364699    *    4/1978    ........... B29B 7/7495
(Continued)

OTHER PUBLICATIONS

Sofragraf FR2364699 English Translation (Year: 1978).*
Yamaguchi KR20000035500 English Translation (Year: 2000).*

*Primary Examiner* — Jacob T Minskey
*Assistant Examiner* — Adrien J Bernard
(74) *Attorney, Agent, or Firm* — Thi D. Dang

(57) ABSTRACT

A resin infusion method that incorporates a melt-on-demand approach. The method includes: (a) providing a curable resin composition in the form of a block of frozen resin (20); (b) coupling the block of frozen resin (20) to an inlet port of a heated extruder (22), which comprises at least one rotating screw (24) housed within a heated barrel (25); (c) progressively melting the block of frozen resin (20) at the inlet port and concurrently feeding the melt resin through the heated barrel (25) to produce a liquid resin having a viscosity suitable for resin infusion; (d) continuously feeding the
(Continued)

liquid resin exiting from the extruder to a mold, which contains a fibrous preform; and (e) introducing the liquid resin into the fibrous preform, wherein the block of frozen resin (20) provides an amount of resin composition sufficient for infusing the entire fibrous preform.

16 Claims, 4 Drawing Sheets

(51) Int. Cl.
    *B29C 70/54*     (2006.01)
    *B29C 48/285*     (2019.01)
    *B29B 13/02*     (2006.01)
    *B29K 63/00*     (2006.01)
    *B29C 48/375*     (2019.01)
    *B29C 48/00*     (2019.01)
    *B29C 48/03*     (2019.01)
    *B29C 48/875*     (2019.01)
    *B29K 105/00*     (2006.01)

(52) U.S. Cl.
    CPC .......... *B29C 48/475* (2019.02); *B29C 70/546* (2013.01); *B29C 48/001* (2019.02); *B29C 48/022* (2019.02); *B29C 48/03* (2019.02); *B29C 48/388* (2019.02); *B29C 48/875* (2019.02); *B29K 2063/00* (2013.01); *B29K 2105/0005* (2013.01)

(56) References Cited

U.S. PATENT DOCUMENTS

| | | | |
|---|---|---|---|
| 3,135,623 A | 6/1964 | Altwicker | |
| 3,171,643 A | 3/1965 | Roos | |
| 3,214,935 A | 11/1965 | Conto | |
| 3,380,270 A | 4/1968 | Sauve | |
| 3,386,495 A | 6/1968 | McCurdy et al. | |
| 3,622,045 A | 11/1971 | Delaney, Jr. et al. | |
| 3,656,826 A | 4/1972 | Fraser et al. | |
| 3,800,986 A | 4/1974 | Stamp | |
| 3,935,124 A | 1/1976 | Thene et al. | |
| 3,979,488 A | 9/1976 | Greenhalgh et al. | |
| 3,983,730 A | 10/1976 | Fiorentino | |
| 4,012,478 A * | 3/1977 | Horikawa | B29C 48/793 264/211 |
| 4,450,778 A | 5/1984 | Quick | |
| 4,942,013 A | 7/1990 | Palmer et al. | |
| 5,037,598 A | 8/1991 | Akselrud | |
| 5,318,198 A * | 6/1994 | Micek | B05C 11/1042 222/105 |
| 5,837,739 A | 11/1998 | Nowak et al. | |
| 6,145,323 A | 11/2000 | Popp et al. | |
| 7,208,219 B2 | 4/2007 | Polk, Jr. | |
| 8,652,371 B2 | 2/2014 | Smith et al. | |
| 8,851,879 B2 | 10/2014 | Waldrop et al. | |
| 2004/0121052 A1 | 6/2004 | Roth | |
| 2005/0163881 A1* | 7/2005 | Pierick | B29C 44/0461 425/4 R |
| 2010/0244313 A1 | 9/2010 | Eberth et al. | |
| 2011/0151232 A1* | 6/2011 | Meegan | B29C 70/443 428/221 |
| 2012/0018918 A1 | 1/2012 | Eberth et al. | |
| 2020/0039112 A1* | 2/2020 | Baeck | B29B 13/022 |

FOREIGN PATENT DOCUMENTS

| | | | |
|---|---|---|---|
| GB | 751706 | 7/1956 | |
| KR | 20000035500 A * | 6/2000 | ........... B29B 7/7495 |
| WO | 2015168815 A1 | 11/2015 | |

\* cited by examiner

RESIN INFUSION PROCESS FOR MANUFACTURING FIBER-REINFORCED COMPOSITES

CROSS-REFERENCE TO RELATED APPLICATIONS

The present application is a U.S. national phase entry under 35 U.S.C. § 371 of International Application No. PCT/US2016/067011, filed on 15 Dec. 2016, which claims priority to U.S. provisional Application No. 62/267,947, filed on 16 Dec. 2015, the entire content of each of these applications is explicitly incorporated herein by reference.

The present disclosure relates to the manufacturing of fiber-reinforced composite structures by a resin infusion process such as Resin Transfer Moulding (RTM).

DETAILED DESCRIPTION

Figure 1:
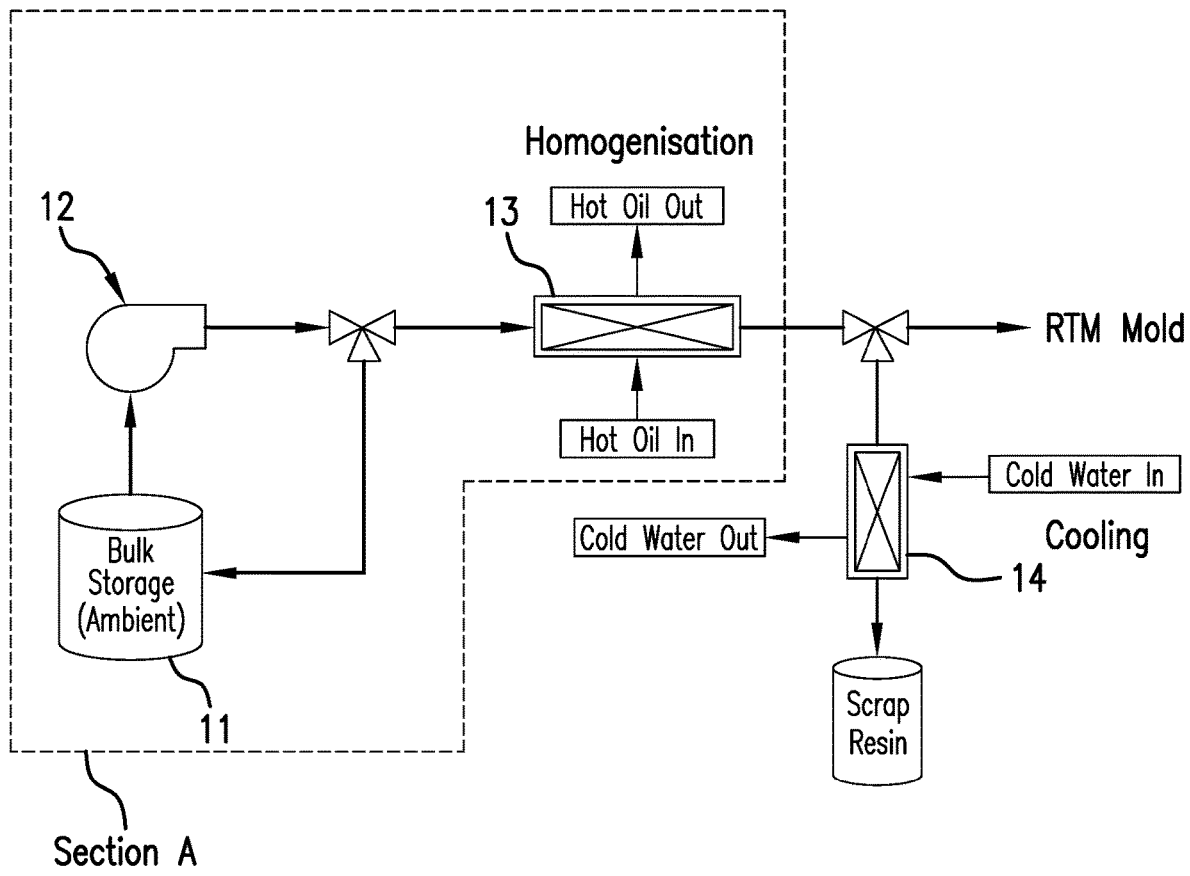
FIG. 1 schematically illustrates a known RTM process in which a bulk quantity of a curable resin is held at ambient or supra-ambient temperatures.

Three-dimensional fiber-reinforced composite parts can be manufactured using different methods, one of which is liquid molding. Resin Transfer Molding (RTM) and VAR™ are examples of manufacturing processes that involve injecting a liquid resin into a fibrous preform. During the RTM process, the preform is placed into an enclosed mold cavity, and the resin is injected into the cavity under pressure. The mold with the preform is often put under vacuum so that the vacuum removes all the entrapped air in the preform and speeds up the RTM process. Once the liquid resin fills the mold cavity, the resin is cured, resulting in the formation of a composite part. VAR™ is similar to RTM except that a single-sided tool is normally used with vacuum bagging, and vacuum pulls the liquid resin into the preform. The fibrous preform is an assembly of dry reinforcement fibers, usually in the form of fabric plies which are laid up in a stacking arrangement. These techniques are well suited for the manufacturing of very complex-shape parts, in many cases at reasonable production rates.

Thermoset resins, particularly epoxy resins, have been widely used as matrix resins for such fiber-reinforced composite parts because of their desirable characteristics such as thermal and chemical resistance, adhesion and abrasion resistance. For RTM processing, dissolution of the cure agent into the resin phase facilitates a simple "heat, inject/wet out and cure" process methodology with the understanding and trade off that, due to the intimate mixing of the resin and cure agent, the resin composition displays an element of self-reactivity even at ambient temperatures. Due to this reactivity, the resin is preferably stored at cold temperature conditions (e.g. less than −18° C.) prior to resin infusion to prevent reaction. However, warming the cold resin to ambient conditions causes it to become extremely adhesive and difficult to handle. The feedstock resin may be in the form of chips or pellets, but the chips/pellets may stick together at room temperature and become difficult to feed into a pump, and also, the chips/pellets of resin may stick to, or drag along the surfaces of the feed chute or auger. Therefore, the way in which the thermoset resins is handled for RTM processing is an important consideration and has proven to be a limiting factor.

When the epoxy-based resin formulation containing amine curing agent is stored in a container (particularly a heated container), the safe-storage time decreases as the storage temperature increases due to chemical reaction between the resin and the cure agent. Moreover, as the storage temperature increases the kinetics, heat generation of such reactions also increases. Such a trend is problematic in production processes as it determines the maximum amount of time or storage temperature that the resin can have at specific points in the process cycle; this in turn limits the quantity and throughput of a process utilizing the resin. If the interaction of the epoxy and amine functionalities could be reduced until the point in the production process that requires the fully formulated resin system, then safety factor associated with storing the resin could be increased dramatically.

One method that is regularly used in RTM to overcome the issue of resin storage stability of RTM formulations is to provide a two-part resin system, where the epoxy component and the cure agent are stored in separate tanks until the point at which they are required to be mixed together. This method has been shown to eliminate reactivity up until the components are mixed together. However, this approach often introduces difficulties relating to the certainty of the ratio of resin to cure agent at a given point in the process and the thoroughness of the mixing process itself. As a result, assessing and calibrating the composition of the recombined product is often based solely upon a mass or flow balance measurement before the process is initiated.

FIG. 1 illustrates a known RTM process in which a bulk quantity of resin containing curing agent is held at ambient, or supra-ambient temperatures. The bulk resin is stored in a container 11 in order to facilitate pumping via a metering-type device 12 into a heat exchange/degassing unit 13. Any soluble components of the resin, e.g. curing agent, which were initially in particulate form, are dissolved at the unit 13. Then, the heated resin is transferred into an RTM mold or tool, which holds the fibrous preform. During shut down or an upset condition, the resin can be diverted to pass through a heat exchanger 14 to be cooled down. This known process highlights the problem associated with storing and handling bulk amount of reactive resin discussed above.

An alternative resin infusion method that incorporates a melt-on-demand (MOD) approach for supplying resin is disclosed. Particularly, this method avoids storing reactive resin in bulk amount at ambient or supra-ambient temperatures. As such, section A of FIG. 1 can be replaced with a more effective arrangement. Generally, the resin infusion method with MOD approach includes:

(a) providing a curable resin composition in the form of a block of frozen resin as feedstock, wherein the block of frozen resin provides an amount of resin composition sufficient for completely infusing a fibrous preform;

(b) coupling the block of frozen resin to an inlet port of a heated extruder;

(c) progressively melting the block of frozen resin at the inlet port and concurrently feeding the melted resin through the extruder to produce a liquid resin having a viscosity suitable for resin infusion;

(d) continuously feeding the liquid resin from the extruder to a mold, which contains the fibrous preform; and (e) introducing the liquid resin into the fibrous preform.

The term "frozen" as used herein refers to the condition of being cooled to a temperature below the freezing point of the resin composition. The term "curable" as used herein means that the composition is capable of being subjected to conditions, e.g. heating, which will render the composition to a hardened or thermoset state.

Figure 2:
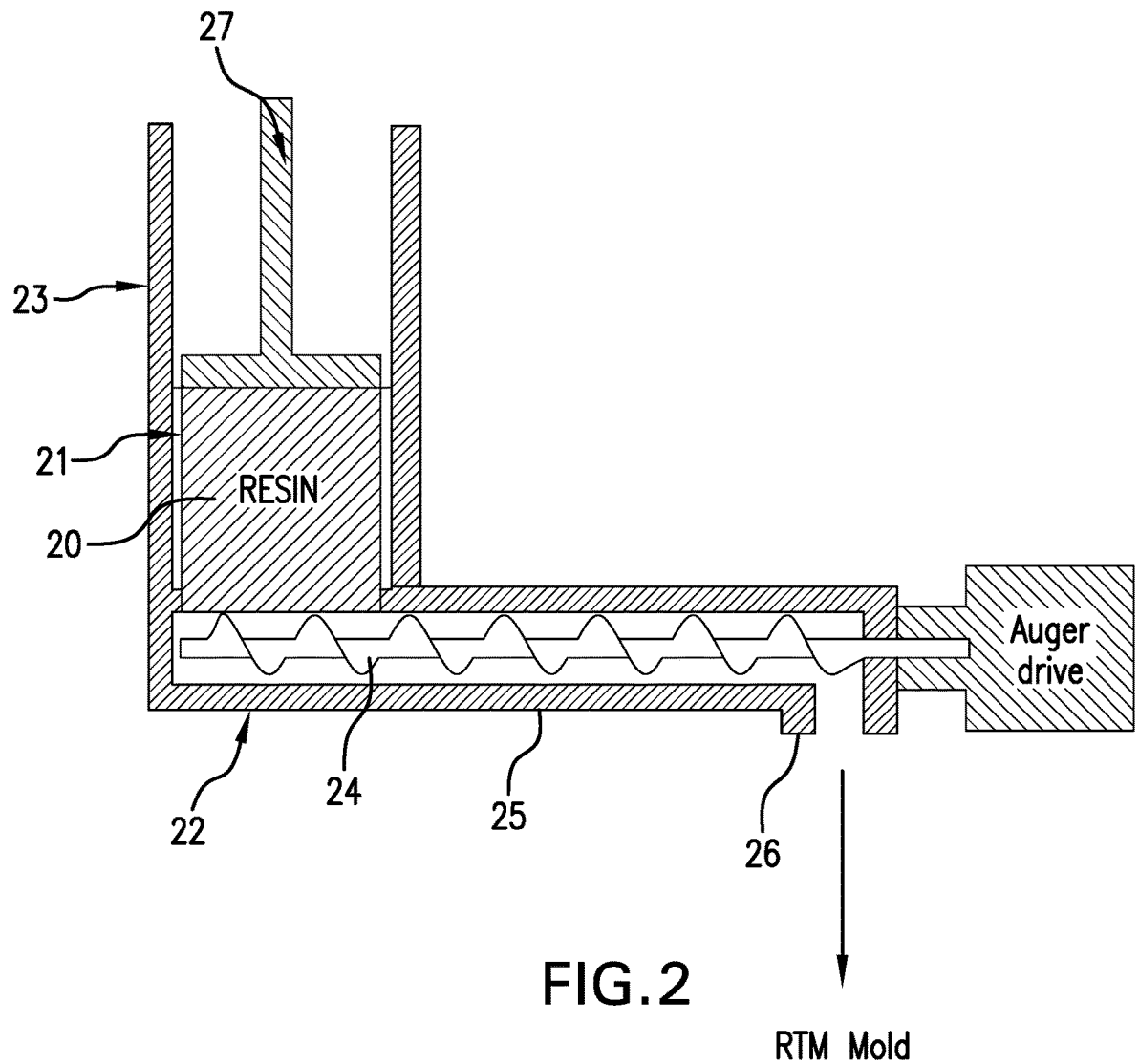
FIG. 2 schematically illustrates an embodiment of a resin infusion system that incorporates a melt-on-demand approach for supplying resin.

FIG. 2 illustrates a system for carrying out the MOD resin infusion method according to one embodiment. In this embodiment, a block of frozen resin 20, for example, in the shape of a cylindrical log, is contained in a reusable casing or "slip case" 21, which is connected to an inlet port of an extruder 22. To stabilize and maintain the position of the resin slip case 21 relative to the extruder 22, a guiding wall 23 is provided. The slip case 21 is configured to accommodate the shape and size of the frozen resin block 20. For example, the slip case 21 may have a tubular shape to accommodate a cylindrical log of frozen resin. The extruder 22 includes at least one rotatable screw (or auger) 24 housed coaxially within a heated, cylindrically-shaped barrel 25. A single-screw or twin-screw extruder may be used for the intended purpose herein. The barrel 25 of the extruder is divided into a number of heating zones, for example, 3 to 6 zones, and includes an outlet aperture 26. In one embodiment, the heating zones of the extruder are set for generating a temperature gradient in the range of from about 30° C. to about 300° C. It is particularly advantageous for the extruder to possess multiple separate temperature controllable heating zones to generate a temperature gradient. A movable piston 27 is provided to drive the frozen resin into the extruder.

Figure 3:
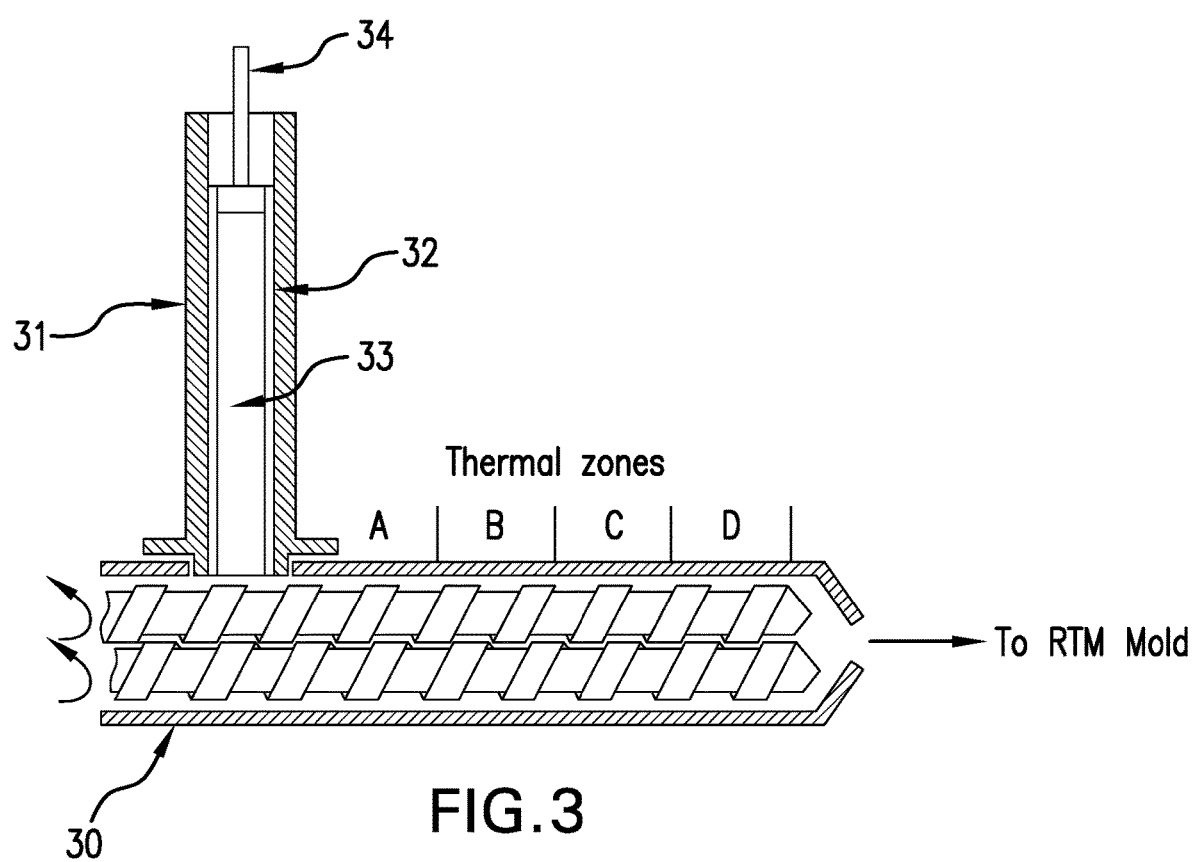
FIG. 3 schematically illustrates another embodiment of a resin infusion system that incorporates a melt-on-demand approach for supplying resin.

FIG. 3 shows an exemplary set-up, in which a commercially available extruder from Thermo Electron Corporation, PRISM TSE 24 TC twin-screw extruder 30 with multiple heating zones is used to carry out the melt-on-demand method disclosed herein. In this case, a guide tube 31 is separately provided as an interfacing structure for coupling the slip case 32 containing frozen resin 33 to the inlet of the extruder. A movable piston 34 is provided to drive the frozen resin into the extruder.

In either of the set-ups shown in FIG. 2 and FIG. 3, the frozen resin block progressively melts at its lower end as it is being forced into contact with the extruder screw, which then transports the resin along the heating zones of the heated barrel. The movable piston, which is mechanically driven or connected to a hydraulic actuator, applies the necessary pressure onto the top end of the frozen resin block to displace the frozen resin vertically from the slip case as the frozen resin melts. Preferably, the piston is driven to apply a constant pressure to the resin block. The screw(s) of the extruder rotate(s) within the heated barrel and drives the melted resin material through the multiple heating zones within the barrel. By the time the melted resin reaches the outlet aperture of the barrel, considerable pressure has been built up so that the melted resin can be forced through the outlet aperture. The resin exiting the outlet aperture of the extruder barrel is in liquid form and is fed continuously via a feed line to a resin infusion mold, which contains the fibrous preform to be injected/infused. As such, the resin exiting the outlet aperture of the extruder has a viscosity that is suitable for resin injection via RTM. In a preferred embodiment, the liquid resin exiting the extruder has a viscosity of less than 5 Poise at a temperature in the range of 80° C. and 130° C.

The mold containing the fiber preform is a conventional tool for liquid resin infusion processes, particularly RTM and VAR™. Such mold is typically equipped with one or more injection ports and vacuuming mechanisms for injecting the resin at a pressurized condition. The mold for liquid resin infusion may be a two-component, closed mold, for example, as described in U.S. Pat. No. 4,891,176, or a vacuum bag sealed, single-sided mold, for example, as described in U.S. Pat. Nos. 4,942,013, 4,902,215, 6,257,858, and 8,652,371.

Several conditions may be varied during the extrusion process to arrive at the desired resin properties for resin injection. Such conditions include, by way of example, resin composition, feed rate, operating temperature, extruder screw RPM, residence time, heating zone length, and extruder torque and/or pressure. Methods for the optimization of such conditions are known to those skilled in the art. It is preferable to select an operating temperature range that will minimize the degradation or the advancement of the level of cure in the resin composition during the extrusion process. In some embodiments, the operating temperature range during the extrusion process may be in the range of from about 30° C. to about 300° C. as determined by the setting for the extruder's heating zones.

Figure 4:
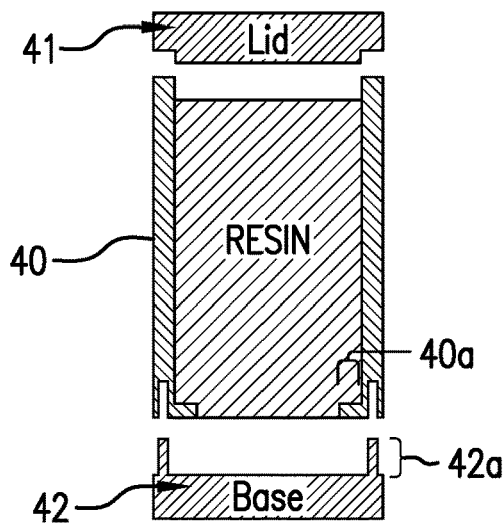
FIG. 4 shows a reusable slip case for storing frozen resin as feedstock, according to one embodiment.

FIG. 4 illustrates an embodiment of a reusable casing or slip case for containing and storing a frozen block of resin prior to the melt-on-demand method disclosed herein. The resin casing has an open-ended housing 40, which may be cylindrical in shape, a top cap (or lid) 41 and a bottom cap (or base) 42 that are removable from the housing 40. In use, the slip case 40 (without the caps 41, 42) together with the frozen resin therein are both inserted into the guiding wall 23 shown in FIG. 2 or guiding tube 31 shown in FIG. 3. The top cap 41 may be configured to recess into the housing to define the contacting surface for the piston to locate. The bottom cap 42 may contain retaining pins 42a that fit into complementary recesses in the housing 40. Also, the housing 40 may be provided with a ram stop 40a at the lower end to prevent the piston from colliding with the extruder's screw(s) when all of the resin has been driven into the extruder. The housing 40 of the slip case is made of a low-friction material, for example, polytetrafluoroethylene (PTFE), that enables it to slide easily into and out of a receptacle (e.g., guiding wall 23 shown in FIG. 1), and that has low adhesion to the frozen resin block. In addition, the slip case is sized so that there is sufficient amount of resin for fully injecting a particular preform in one shot. The slip case protects the process operators from handling the resin unnecessarily, thereby minimizing contamination.

Figure 5:
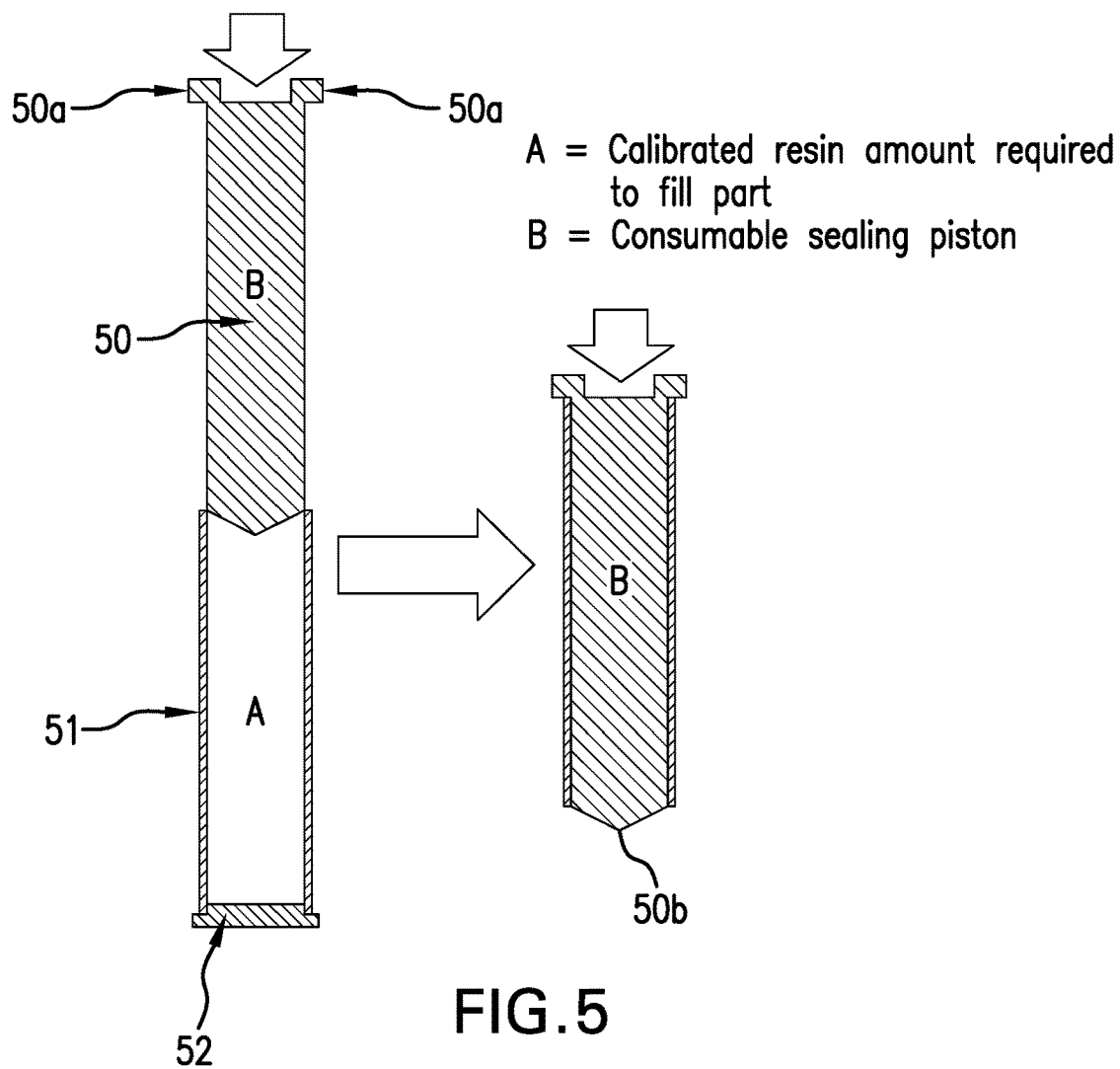
FIG. 5 illustrates a method for a subsequent cleaning phase using a consumable piston.

Furthermore, it was also recognized that the clean down of the equipment following an infusion operation would present difficulty due to either the down time period required to cool and clean the extruder or the risk in cleaning the extruder in a 'hot' condition. To solve this issue, another embodiment for the slip case and piston configuration is provided and shown in FIG. 5. In FIG. 5, a consumable piston 50 composed of a consumable, purge material is used to drive the frozen resin block into the extruder. The purge material is a nonreactive hot-melt extrudable material and can be driven into the extruder as part of a subsequent clean down procedure for cleaning the extruder's barrel. A hot-melt extrudable polymer is one that is sufficiently rigid at standard ambient temperature (20° C.-25° C.) and pressure (1 atm) but is capable of deformation or forming a semi-liquid state (having a viscosity and rigidity intermediate between that of a solid and a liquid) under elevated temperatures. An example of such purge material is polypropylene or a similar chemically unreactive material. The consumable piston 50 is configured to completely displace the calibrated amount of resin A contained in the slip case 51 with a lower cap 52 at the other end such that the consumable piston completely fills the space that was occupied by the resin block when all of the resin block has melted and fed into the extruder. The calibrated amount of resin A is the amount required to completely infuse and wet out a fibrous preform. The consumable piston 50 is also provided with a plurality of breakable lugs or stoppers 50a which function to stop the piston from moving further through the slip case when the resin block has been completely displaced. After the resin infusion process is completed, the breakable lugs 50a are broken off and discarded. And the consumable piston 50 is driven into the operating extruder via the same mechanically driven or hydraulically actuated, non-consumable piston described above in reference to FIGS. 2 and 3, and the purge material is extruded through the outlet aperature of the barrel. The consumable piston 50 has a protruding (pointed or blunt) tip 50b, e.g., a conical tip, which can make the initial contact with the rotating screw of the extruder. Cleaning is then a matter of removing the re-solidified residues of the purge material after the extruder has cooled. In this way, the risk of the thermoset resin curing in the extruder's barrel can be significantly reduced.

The stability of thermoset resin formulations containing reactive curing agents as a function of time at storage temperature is a factor in determining a set of safe processing conditions for their use. One such way to define safe processing conditions is to derive the adiabatic Time to Maximum Rate (TMR) from Accelerate Rate calorimetry (ARC) experiments. The TMR defines the limit at which the composition can be held at a given temperature before the onset of self-accelerating kinetics is reached. It is believed that the MOD approach disclosed herein extends the TMR of the resin to an effectively infinite value for storage and retains the process-ability of the resin in its ambient, or supra ambient state, thereby resulting in near zero exotherm risk during the resin storage phase of processing. Also, continuous processing means minimal volume of resin held at a supra ambient temperature during the warming process, hence, exotherm risk during processing can be minimized relative to the conventional bulk-resin process. If an exotherm does occur during extrusion, the barrel could be swept clean and processing can resume.

Fibrous Preform

The fibrous preform in the resin infusion method disclosed herein is configured for receiving liquid resin via resin infusion or injection, i.e., it is permeable to liquid resin. The preform consists of an assembly of dry reinforcement fibers, which may be in the form of continuous, unidirectionally-aligned (or "unidirectional") fibres or tows, woven fabric, nonwoven veil or mat, multiaxial fabric (e.g. non-crimped fabric or NCF), or combination thereof. Continuous tows are made up of multiple fibre filaments, for example, 3000-24,000 filaments. The assembly may compose layers of dry reinforcement fibers laid up in a stacking arrangement.

The reinforcement fibers may be made of materials selected from, but are not limited to, glass (including Electrical or E-glass), carbon (including graphite), aramid, polyamide, high-modulus polyethylene (PE), polyester, poly-p-phenylene-benzoxazole (PBO), boron, quartz, basalt, ceramic, and combinations thereof. For the fabrication of high-strength composite materials, e.g., materials for aerospace and automotive applications, particularly suitable reinforcing fibers are carbon fibers.

Resin Composition

The curable resin composition for the resin infusion or RTM method disclosed herein contains one or more thermoset resins and at least one curing agent. Moreover, the curable resin composition is thermally curable. The resin composition is formulated such that the viscosity is less than 5 Poise at a temperature of less than 180° C., more specifically, in the range of about 80° C. and about 130° C. The resin composition may also contain toughening particles of sub-micron particle sizes, however, unless the particles are very small, the particles would be effectively filtered out by the fibers in the preform, resulting in uneven distribution of the particles, and in some cases, complete blocking of the mold from further resin injection. Thus, when present, the toughening particles have a particle size of 800 nm or less, for example, in the range of from about 2 nm to about 800 nm, or from about 50 nm to about 200 nm.

The thermoset resins may be selected from: epoxies, bismaleimide, benzoxazine, cyanate ester, vinyl ester, polyisocyanurates, bismaleimide, cyanate ester, phenolic resins, and any combination thereof. Particularly suitable are multifunctional epoxy resins having epoxy functionality of greater than one. Multifunctional epoxy resins include polyepoxide compounds having more than one epoxide group per molecule available for reaction with the amine curing agents. In general, the multifunctional resins may be saturated, unsaturated, cyclic or acyclic, aliphatic, alicyclic, aromatic or heterocyclic molecules with epoxy functionality. Multifunctional epoxy resins include those based upon: phenol and cresol epoxy novolacs, glycidyl ethers of phenolaldelyde adducts; glycidyl ethers of dialiphatic diols; diglycidyl ether; diethylene glycol diglycidyl ether; aromatic epoxy resins; dialiphatic triglycidyl ethers, aliphatic polyglycidyl ethers; epoxidised olefins; brominated resins; aromatic glycidyl amines; heterocyclic glycidyl imidines and amides; glycidyl ethers; fluorinated epoxy resins.

Examples of suitable epoxides include polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl) methane), bisphenol S, bis(4-hydroxyphenyl)-1,1-isobutane, fluorene 4,4'-dihydroxybenzophenone, bis(4-hydroxyphenyl)-1,1-ethane, bisphenol Z (4,4'-Cyclo-hexylidenebisphenol), and 1,5-hydroxy-naphthalene. Also suitable are the polyglycidyl ethers of polyalcohols, aminophenols or aromatic diamines.

Additional examples include: polyglycidyl ethers of polyvalent phenols, for example pyrocatechol; resorcinol, hydroquinone; 4,4'-dihydroxydiphenyl methane; 4,4'-dihydroxy-3,3'-dimethyldiphenyl methane; 4,4'-dihydroxydiphenyl dimethyl methane; 4,4'-dihydroxydiphenyl methyl methane; 4,4'-dihydroxydiphenyl cyclohexane; 4,4'-dihydroxy-3,3'-dimethyldiphenyl propane; 4,4'-dihydroxydiphenyl sulfone; or tris(4-hydroxyphenyl)methane; polyglycidyl ethers of the chlorination and bromination products of the abovementioned diphenols; polyglycidyl ethers of novolacs (i.e., reaction products of monohydric or polyhydric phenols with aldehydes, formaldehyde in particular, in the presence of acid catalyst).

Further examples of epoxy resins include diglycidyl ethers of diene-modified phenolic novolacs, the reaction products of polyfunctional cycloaliphatic carboxylic acids with epichlorohydrin, cycloaliphatic epoxides, cycloaliphatic epoxy ethers and cycloaliphatic epoxy esters, and the like.

Suitable multifunctional epoxy resins may include di-functional, tri-functional, and tetra-functional epoxies, in any combination. Examples of di-functional epoxy resins include diglycidyl ethers of bisphenol A (e.g. Epon™ 828 (liquid epoxy resin), DER 331, DER 661 (solid epoxy resin) from Dow Chemical Co., EJ-190 from by Dyne Chemical Co., Tactix 123 from Huntsman Advanced Materials), diglycidyl ethers of bisphenol F (DGEBF) (e.g., PY306 from Huntsman Advanced Materials, Epikote™ 158 (from Momentive). Examples of tri-functional epoxy resins include triglycidyl ether of aminophenol, e.g. Araldite® MY 0510, MY 0500, MY 0600, MY 0610 supplied by Huntsman Advanced Materials. Examples of tetra-functional epoxy resins include tetraglycidyl ether of methylene dianiline (e.g. Araldite® MY 9655 from Huntsman Advanced Materials), tetraglycidyl diaminodiphenyl methane (e.g., Araldite® MY 721, MY 720, MY 725, MY 9663, MY 9634, MY 9655 supplied by Huntsman Advanced Materials).

Suitable curing agents include amine curing agent(s). Such curing agents include compounds having a molecular weight up to 500 per amino group, for example an aromatic amine or a guanidine derivative. Particularly suitable is an aromatic amine having at least two amino groups per molecule. Examples include diaminodiphenyl sulphones, for instance where the amino groups are in the meta- or in the para-positions with respect to the sulphone group. Particular examples of amine curing agents suitable for use in the present disclosure are 3,3'- and 4-,4'-diaminodiphenylsulphone (DDS); 4,4'-methylenedianiline (MDA); bis(4-amino-3,5-dimethylphenyl)-1,4-diisopropylbenzene; bis(4-aminophenyl)-1,4-diisopropylbenzene; 4,4'-methylenebis-(2,6-diethyl)-aniline (MDEA); 4,4'-methylenebis-(3-chloro, 2,6-diethyl)-aniline (MCDEA); 4,4'methylenebis-(2,6-diisopropyl)-aniline (M-DIPA); 3,5-diethyl toluene-2,4/2,6-diamine (D-ETDA 80; Lonza); 4,4'methylenebis-(2-isopropyl-6-methyl)-aniline (M-MIPA); 4-chlorophenyl-N,N-dimethyl-urea; 3,4-dichlorophenyl-N,N-dimethyl-urea (e.g. Diuron™); dicyanodiamide (e.g., Amicure™ CG 1200 from Pacific Anchor Chemical); and 9,9 bis(aminophenyl) fluorenes such as 9,9 bis(3-chloro-4-aminophenyl)fluorene (CAF), 9,9-bis(3-methyl-4-aminophenyl)fluorene (OTBAF) and 9,9-bis(4-aminophenyl)fluorene. Preferably, the curing agents are selected from MCDEA, MDEA, MDA, 3,3'-DDS and 4,4-DDS, and preferably from MCDEA, MDEA and MDA.

In some embodiments, the curable resin composition contains a combination of multifunctional epoxy resins and an amine curing agent, wherein the epoxy resins and the amine curing agent are present in amounts sufficient to provide a molar ratio of amine groups present in the curing agent: epoxy groups present in the epoxy component of from about 0.5:1.0 to about 1.0:0.5, preferably from about 0.75:1 to about 1:0.75, preferably from about 0.9:1.0 to about 1.0:0.9, in some embodiments, the ratio is about 1:1.

The thermoset resin(s) and the curing agent(s) make up the bulk of the curable composition, and the balance of the curable composition may include a toughening component, which may be sub-micron particles or a soluble thermoplastic polymer.

Suitable toughening particles may be core-shell particles, having a particle size of 800 nm or less, for example, in the range of from about 50 nm to about 200 nm, preferably, about 50 nm to about 100 nm. Core-shell particles comprise an inner core portion and an outer shell portion which substantially encases the inner core portion. The core portion is preferably a polymeric material having an elastomeric or rubber property, i.e. a relatively low glass transition temperature (particularly relative to the material of the outer shell portion) and preferably less than about 0° C., e.g. less than about −30° C. The outer shell portion is preferably a glassy polymeric material, i.e. a thermoplastic or cross-linked thermoset polymer having a glass transition temperature greater than ambient temperature (20° C.), preferably greater than about 50° C. A preferred core-shell particle contains a core material of polybutadiene-styrene copolymer, and an outer shell which is a homopolymer or copolymer of methylmethacrylate, optionally functionalised. Examples of commercially available core-shell particles are those available from Kaneka Corp. under the trademarks Kane Ace MX, such as MX660 and MX411.

Also suitable as toughening agent are inorganic particles selected from particles of metal salts (for instance calcium carbonate) and metal oxides such as $SiO_2$, $TiO_2$ and $Al_2O_3$. The particles may be referred to as nano-particles. In some embodiments, the inorganic particles have a particle size in the range of from about 2.0 nm to about 50 nm.

When present, the toughening particles are in present in an amount of no more than 5.0 wt % (weight percentage) based on the total weight of the composition.

The particle size discussed herein can be determined by a dynamic light scattering technique, for example, using a Malvern Zetasizer 2000.

The curable composition may include, as toughening agent, a small amount (less than 7 wt %, preferably, no more than 5 wt %) of a soluble thermoplastic polymer that dissolves into the composition at an elevated temperature. Suitable thermoplastic polymers include polyarylsulfone polymers, for example, polyethersulfone (PES).

What is claimed is:

1. A resin infusion method comprising:
   (a) cooling a curable resin composition comprising one or more thermoset resins and a curing agent to a temperature below the freezing point of the curable resin composition to form a block of frozen resin;
   (b) coupling the block of frozen resin to an inlet port of a heated extruder, which comprises at least one rotating screw housed within a heated barrel;
   (c) progressively melting the block of frozen resin at the inlet port and concurrently feeding the melted resin through the heated barrel to produce a liquid resin having a viscosity suitable for resin infusion;
   (d) continuously feeding the liquid resin exiting from the extruder to a mold, which contains a fibrous preform; and
   (e) introducing the liquid resin into the fibrous preform, wherein the block of frozen resin provides an amount of resin composition sufficient for infusing the entire fibrous preform.

2. The method of claim 1, wherein the block of frozen resin is stored in a reusable casing prior to step (a), said casing comprising a tubular wall, a top cap and a bottom cap, and
   wherein the top and bottom caps are removed from the tubular wall prior to coupling the block of frozen resin to the inlet port of the heated extruder.

3. The method of claim 2, wherein the tubular wall of the reusable casing is made of a low-friction material that enables the block of frozen resin to slide through.

4. The method of claim 3, wherein the low-friction material is polytetrafluoroethylene.

5. The method according to claim 1, wherein, at (b), the block of frozen resin is placed inside a receptable, which is mechanically connected to the inlet port of the extruder such that one end of the block of frozen resin is in the inlet port of the extruder, and pressure is applied to the opposite end of the block of frozen resin to displace the frozen resin from the receptacle as it melts.

6. The method of claim 5, wherein the block of frozen resin has a cylindrical shape, and the receptable has a tubular or cylidrical wall that accommodates the cylindrical shape of the block of frozen resin.

7. The method of claim 5, wherein pressure is applied to the opposite end of the block of frozen resin by a piston that is mechanically or hydraulically driven.

8. The method according to claim 1, wherein the extruder further comprises multiple heating zones along a length of the barrel.

9. The method of claim 8, wherein the heating zones of the extruder are set for generating a temperature gradient in the range of from about 30° C. to about 300° C.

10. The method according to claim 1, wherein the liquid resin exiting the extruder has a viscosity of less than 5 Poise at a temperature in the range of 80° C. and 130° C.

11. The method of claim 1, wherein the curable resin composition at (a) comprises one or more epoxy resins and an amine curing agent.

12. The method according to claim 1, wherein the fibrous preform comprises plural layers of reinforcement fibers that are laid up in a stacking arrangement.

13. The method of claim 5, wherein pressure is applied to the opposite end of the block of frozen resin by a consumable piston, which displaces the frozen resin from the receptacle as the frozen resin melts, wherein the consumable piston is made of a nonreactive, extrudable polymer that can be extruded through the barrel of the extruder and is sized to fill the space occupied by the frozen resin when all of the frozen resin has been displaced.

14. The method of claim 13, wherein the consumable piston is formed of an extrudable polymer that is substantially rigid at ambient temperature (20° C.-25° C.) and pressure (1 atm) but is capable of deformation or forming a semi-liquid state when heated.

15. The method of claim 14, wherein the consumable piston is formed of polypropylene.

16. A method for fabricating a composite structure, comprising the resin infusion method according to claim 1 to form a resin-infused preform, followed by:

curing the resin-infused preform to form a hardened composite structure.

* * * * *